United States Patent
Park et al.

(10) Patent No.: US 8,170,570 B2
(45) Date of Patent: May 1, 2012

(54) FAST RETRY OF TRANSMITTING RANDOM ACCESS PREAMBLE USING BITMAP INFORMATION

(75) Inventors: Sung-Jun Park, Gyeonggi-Do (KR); Young-Dae Lee, Gyeonggi-Do (KR); Seung-June Yi, Gyeonggi-Do (KR); Sung-Duck Chun, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 198 days.

(21) Appl. No.: 12/665,662

(22) PCT Filed: Jun. 19, 2008

(86) PCT No.: PCT/KR2008/003478
§ 371 (c)(1),
(2), (4) Date: Dec. 18, 2009

(87) PCT Pub. No.: WO2008/156315
PCT Pub. Date: Dec. 24, 2008

(65) Prior Publication Data
US 2010/0331003 A1    Dec. 30, 2010

Related U.S. Application Data

(60) Provisional application No. 60/945,090, filed on Jun. 19, 2007.

(30) Foreign Application Priority Data

Jun. 18, 2008  (KR) .................. 10-2008-0057285

(51) Int. Cl.
*H04W 88/02*   (2009.01)

(52) U.S. Cl. ...................................................... 455/450
(58) Field of Classification Search ................ 455/3.01, 455/411, 436–444, 450; 370/241, 328, 329, 370/330, 331, 336; 375/340
See application file for complete search history.

(56) References Cited

U.S. PATENT DOCUMENTS

| | | | | |
|---|---|---|---|---|
| 7,110,756 B2 * | 9/2006 | Diener | | 455/423 |
| 7,444,145 B2 * | 10/2008 | Diener | | 455/423 |
| 2006/0274684 A1 * | 12/2006 | Diener | | 370/318 |
| 2010/0200698 A1 * | 8/2010 | Kreshchishin et al. | | 244/130 |
| 2010/0278114 A1 * | 11/2010 | Kwon et al. | | 370/328 |
| 2011/0032876 A1 * | 2/2011 | Lee et al. | | 370/328 |
| 2011/0032889 A1 * | 2/2011 | Lee et al. | | 370/329 |

OTHER PUBLICATIONS

Yoshihisa Kishiyama et al., "Investigations on Random Access Channel Structure in Evolved UTRA Uplink," 2006 3rd International Symposium on Wireless Communication Systems, pp. 287-291, Sep. 6-8, 2006.
Yongwan Park et al., "Enhanced Radio Access Technologies for Next Generation Mobile Communication: Chapter 7, Evolved UTRA Technologies," Springer Netherlands, pp. 217-276, May 1, 2007.

* cited by examiner

*Primary Examiner* — Diane Mizrahi
(74) *Attorney, Agent, or Firm* — Lee, Hong, Degerman, Kang & Waimey

(57) ABSTRACT

A fast retry of transmitting a random access preamble by determining an existence of a random access response during a random access procedure in an Evolved Universal Mobile Telecommunications System (E-UMTS) evolved from Universal Mobile Telecommunications System (UMTS) or a Long Term Evolution System (LTE).

15 Claims, 3 Drawing Sheets

| BITMAP position | RA-preamble identifier |
|---|---|
| 1 | 1 ~ 16 |
| 2 | 17 ~ 32 |
| 3 | 33 ~ 48 |
| 4 | 49 ~ 64 |

[Fig. 1]
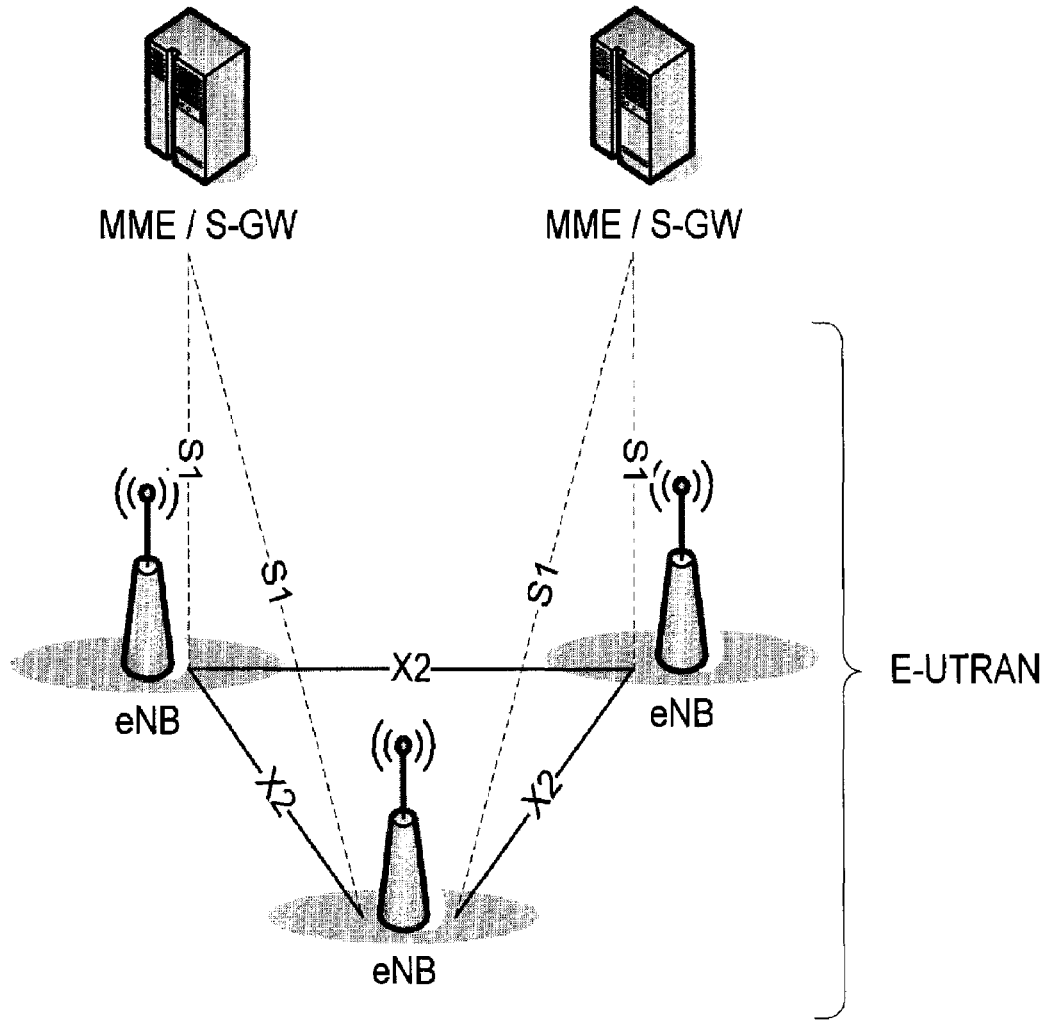
[Fig. 2]
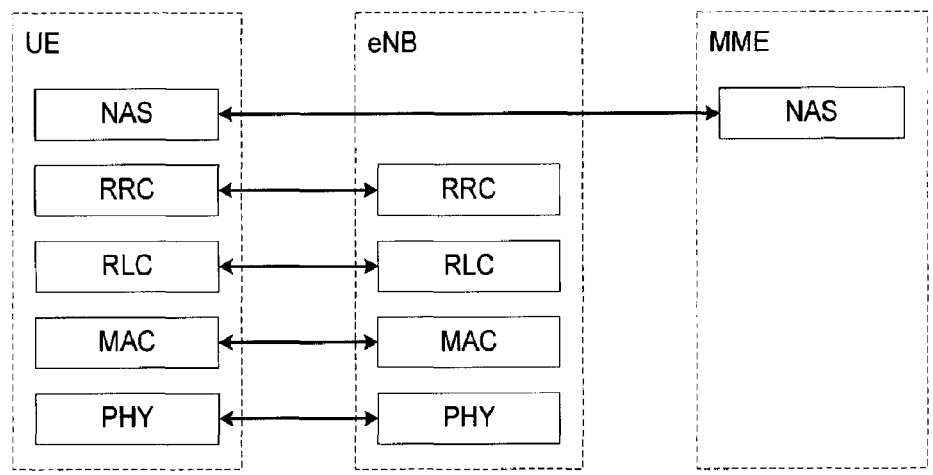

[Fig. 3]
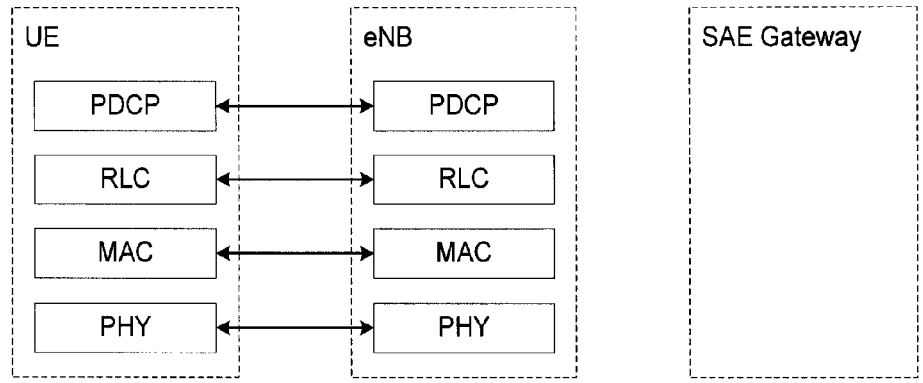
[Fig. 4]
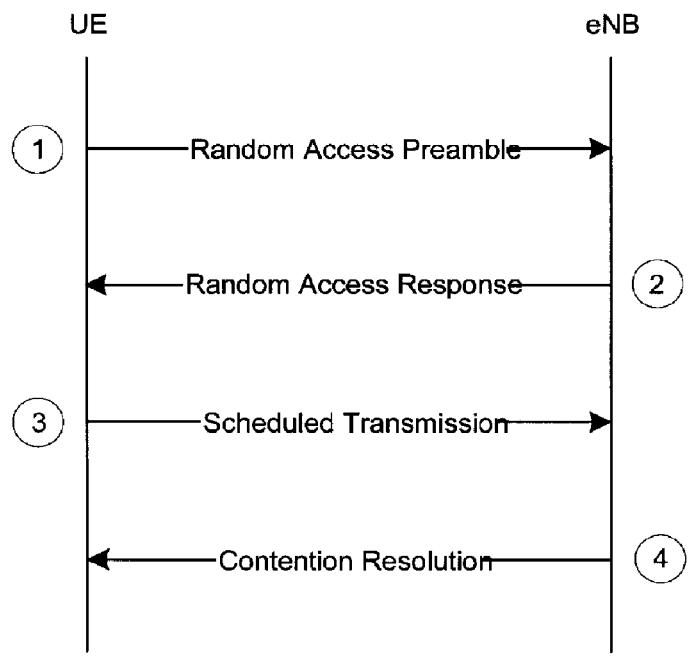
[Fig. 5]
| BITMAP position | RA-preamble identifier |
| --- | --- |
| 1 | 1 ~ 16 |
| 2 | 17 ~ 32 |
| 3 | 33 ~ 48 |
| 4 | 49 ~ 64 |

[Fig. 6]
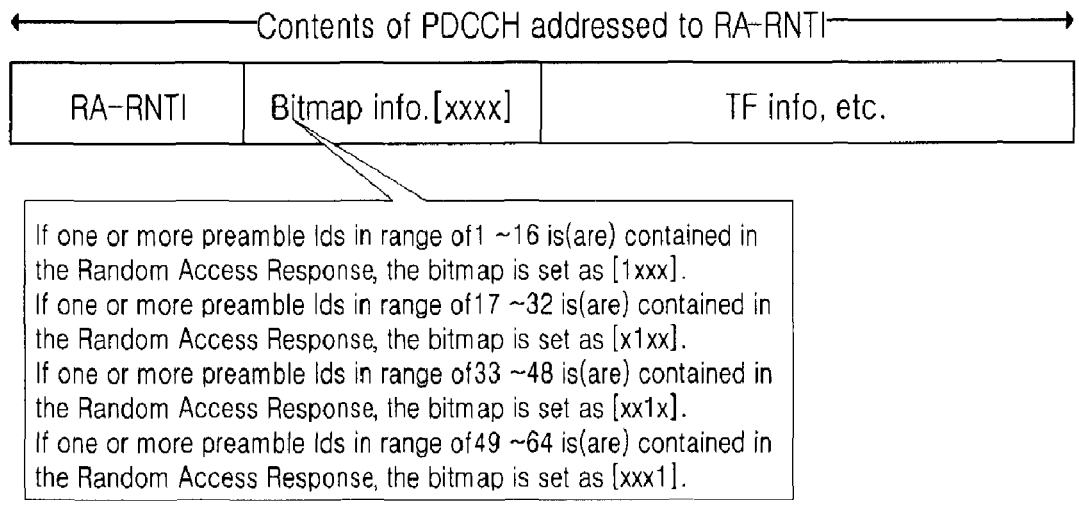
[Fig. 7]
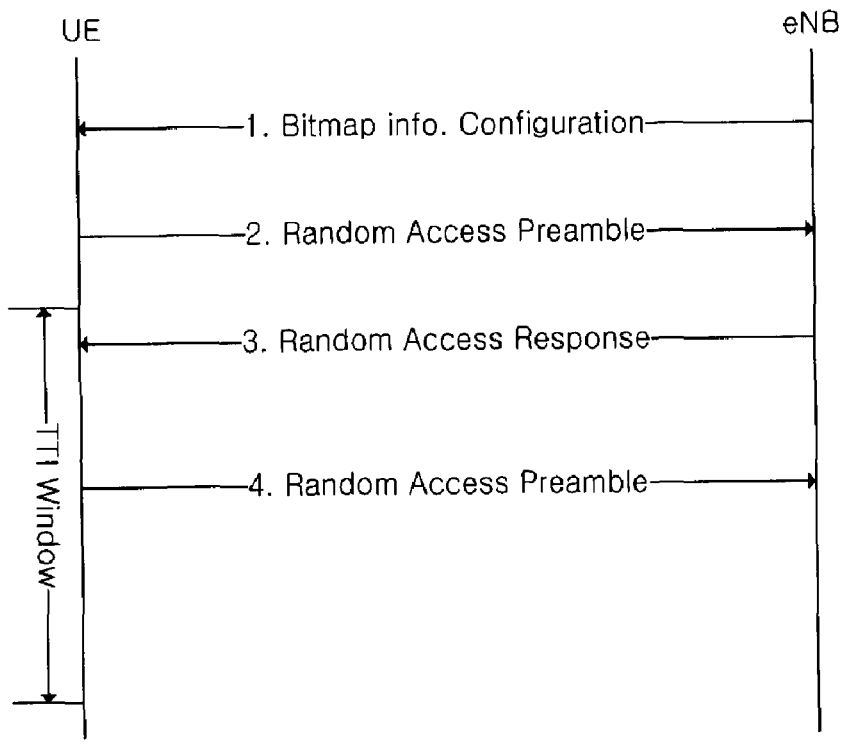

FAST RETRY OF TRANSMITTING RANDOM ACCESS PREAMBLE USING BITMAP INFORMATION

CROSS-REFERENCE TO RELATED APPLICATIONS

This application is a national stage application of International Application No. PCT/KR2008/003478, filed on Jun. 19, 2008, which claims the benefit of earlier filing date and right of priority to Korean Application No. 10-2008-0057285, filed on Jun. 18, 2008, and claims the benefit of Provisional Application No. 60/945,090, filed on Jun. 19, 2007.

TECHNICAL FIELD

The present invention relates to a method for fast retrying a transmission of a random access preamble by determining whether or not there is a random access response during a random access procedure in Evolved Universal Mobile Telecommunications System (E-UMTS) evolved from Universal Mobile Telecommunications System (UMTS) or Long Term Evolution System (LTE).

BACKGROUND ART

FIG. 1 illustrates an exemplary network structure of an Evolved Universal Mobile Telecommunications System (E-UMTS) as a mobile communications system to which the related art and the present invention are applied. The E-UMTS evolved from an existing Universal Telecommunications System (UMTS). Basic standardization of the E-UMTS is currently being developed by the Third Generation Partnership Project (3GPP). The E-UMTS may be called a Long Term Evolution (LTE) system.

An E-UMTS network may be divided into an Evolved UMTS Terrestrial Radio Access Network (E-UTRAN) and a Core Network (CN). The E-UTRAN includes a mobile terminal (User Equipment; UE), a base station (eNode B), and an Access Gateway (AG) located at the end of the network to be connected to an external network. The AG may be divided into a portion for processing a user traffic and a portion for processing a control traffic. The AG portion for processing the user traffic and the AG portion for processing the control traffic are connected to each other via a new communication interface. One or more cells may exist in a single eNode B. An interface for transmitting the user traffic or the control traffic can be used between eNode Bs. Also, the CN may consist of an Access Gateway (AG), a node for user registration of UEs, and the like. An interface for discriminating between the E-UTRAN and the CN can be used.

Radio interface protocol layers between mobile terminal and network may be classified into a first layer (L1), a second layer (L2) and a third layer (L3) based on three lower layers of a well-known interconnection system, such as an open system interconnection (OSI) reference model. Among these, a physical layer belonging to the first layer provides an information transfer service using a physical channel. A Radio Resource Control (RRC) layer positioned in the third layer serves to control radio resources between the mobile terminal and the network. Accordingly, the RRC layer allows an RRC message exchange between the mobile terminal and the network. The RRC layer may be positioned in both eNode B and AG, or positioned only in one of the eNode B or AG.

FIGS. 2 and 3 show radio interface protocol architecture between a terminal and E-UTRAN based on 3GPP radio access network standards. Particularly, FIG. 2 shows radio protocol architecture in a control plane, and FIG. 3 shows radio protocol architecture in a user plane.

The radio interface protocol in FIGS. 2 and 3 has horizontal layers comprising a physical layer, a data link layer and a network layer, and has vertical planes comprising a user plane for transmitting user traffic and a control plane for transmitting control signals. The protocol layers in FIGS. 2 and 3 can be divided into a first layer (L1), a second layer (L2) and a third layer (L3) based on three lower layers of an Open System Interconnection (OSI) standard model widely known in communications systems. Hereinafter, each layer in the radio protocol control plane in FIG. 2 and a radio protocol user plane in FIG. 3 will be described.

A first layer, as a physical layer, provides an information transfer service to an upper layer using a physical channel. The physical layer is connected to its upper layer, called a Medium Access Control (MAC) layer, via a transport channel. The MAC layer and the physical layer exchange data via the transport channel. Data is transferred via a physical channel between different physical layers, namely, between the physical layer of a transmitting side and the physical layer of a receiving side. The physical channel is modulated based on an Orthogonal Frequency Division Multiplexing (OFDM) technique, and utilizes time and frequency as radio resources.

The MAC layer located at the second layer provides a service to an upper layer, called a Radio Link Control (RLC) layer, via a logical channel. The RLC layer of the second layer supports reliable data transmissions. The function of the RLC layer may be implemented as a functional block in the MAC layer. In this case, the RLC layer may not exist. A Packet Data Convergence Protocol (PDCP) layer of the second layer, in the radio protocol user plane, is used to efficiently transmit IP packets, such as IPv4 or IPv6, on a radio interface with a relatively narrow bandwidth. For this purpose, the PDCP layer reduces the size of an IP packet header which is relatively great in size and includes unnecessary control information, namely, a function called header compression is performed.

A Radio Resource Control (RRC) layer located at the lowest portion of the third layer is only defined in the control plane. The RRC layer controls logical channels, transport channels and physical channels in relation to establishment, re-configuration and release of Radio Bearers (RBs). Here, the RB signifies a service provided by the second layer for data transmissions between the terminal and the E-UTRAN.

Downlink transport channels for transmitting data from a network to a mobile terminal may include a Broadcast Channel (BCH) for transmitting system information and a Downlink Shared Channel (SCH) for transmitting a user traffic or a control message. A traffic or control message of a downlink multicast or broadcast service may be transmitted via the downlink SCH or via a separate downlink Multicast Channel (MCH). Uplink transport channels for transmitting data from a mobile terminal to a network may include a Random Access Channel (RACH) for transmitting an initial control message and an uplink Shared Channel (SCH) for transmitting a user traffic or a control message.

Also, downlink physical channels for transmitting information transferred to a downlink transport channel via an interface between a network and a mobile terminal may include a Physical Broadcast Channel (PBCH) for transmitting BCH information, a Physical Multicast Channel (PMCH) for transmitting MCH information, a Physical Downlink Shared Channel (PDSCH) for transmitting PCH information and downlink SCH information, and a Physical Downlink Control Channel (PDCCH) (or called DL L1/L2 control channel) for transmitting control information sent from the first and second layers, such as downlink or uplink radio resource allocation information (DL/UL Scheduling Grant) or the like. Uplink physical channels for transmitting information transferred to an uplink transport channel via an interface between a network and a mobile terminal may include a Physical Uplink Shared Channel (PUSCH) for transmitting uplink SCH information, a Physical Random Access Channel (PRACH) for transmitting RACH information, and a Physical Uplink Control Channel (PUCCH) for transmitting control information sent from the first and second layers, such as HARQ ACK or NACK, Scheduling Request (SR), Channel Quality Indicator (CQI) report and the like.

FIG. 4 is an exemplary view showing a random access procedure according to the related art.

As illustrated in FIG. 4, the mobile terminal firstly transmits a random access preamble to a base station via a selected PRACH resource using system information received from the base station. After receiving the random access preamble from the mobile terminal, then the base station transmits a random access response. The random access response information may include offset information (i.e., time advance value) for compensating a time synchronization of the mobile terminal, uplink radio resource allocation information (i.e., UL Grant) for a scheduled transmission, an index information (i.e., preamble Id) of a random access preamble received for identification between terminals performing a random access, a temporary identifier (i.e., Temporary C-RNTI) of the mobile terminal and the like. After receiving the random access response, the mobile terminal compensates a time synchronization according to the random access response information, and then transmits data including a terminal identifier (e.g., C-RNTI, S-TMSI or Random Id) to the base station using the uplink radio resource allocation information. The base station having received the data transmits a contention resolution to the mobile terminal using the terminal identifier transmitted from the mobile terminal.

Now, transmission and reception of random access preamble and random access response during the random access procedure will be described in detail. The mobile terminal receives system information required for the random access procedure from the base station. The system information may include PRACH radio resource information, an amount of transmission power of a first random access preamble, an increased amount of preamble transmission power, and the like. In particular, the PRACH radio resource information may consist of, for example, time/frequency information related to a radio resource by which the mobile terminal can transmit a random access preamble, information on a repetition period of the radio resource, and the like. That is, the mobile terminal can select the PRACH radio resource using the PRACH radio resource information, thus to transmit a random access preamble to the base station. One RA (Random Access)-RNTI is mapped to each PRACH radio resource. Here, the RA-RNTI denotes a random access identifier which is transmitted by being included in a control channel (i.e., PDCCH) required to receive the random access response transmitted from the mobile terminal via the DL-SCH. That is, the mobile terminal has transmitted the random access preamble by selecting the PRACH radio resource, whereas the mobile terminal tries to receive the PDCCH using the RA-RNTI included in the PRACH radio resource. Upon successfully receiving the PDCCH including the RA-RNTI, the mobile terminal can receive the random access response transmitted via the DL-SCH according to the PDCCH information. However, since the mobile terminal cannot continuously try to receive the PDCCH including the RA-RNTI after transmitting the random access preamble, the receiving window of the random access response information. For example, a time of 3 to 4 ms after transmitting the random access preamble is set as a receiving window of the random access response information. Accordingly, the mobile terminal tries to receive the PDCCH including the RA-RNTI within the receiving window. If the PDCCH including the RA-RNTI is not transmitted within the receiving window, the mobile terminal retries to transmit a random access preamble.

As aforementioned, during a random access procedure, the mobile terminal transmits a random access preamble, determines a RA-RNTI using a PRACH radio resource by which the random access preamble is transmitted, and tries to receive a PDCCH including the RA-RNTI within a random access response receiving window. If the PDCCH is failed to be received within the receiving window, the random access preamble transmission is retried.

On the other hand, in order to minimize an interruption occurred due to random access preambles with adjacent cells, the base station sets such that a random access preamble is transmitted at low power when the mobile terminal transmits a first random access preamble during the random access procedure. However, if the base station does not appropriately receive the random access preamble due to the low power, the base station cannot transmit a random access response, which causes the mobile terminal to fail to receive the PDCCH including the RA-RNTI within the random access response receiving window. Here, the mobile terminal increases the preamble transmission power step by step to retransmit a random access preamble to the base station. That is, the step-by-step increase in the transmission power of the random access preamble allows the base station to minimize the interruption to the adjacent cells, whereby the base station can appropriately receive a random access preamble.

However, in the related art, for the step-by-step increase in the transmission power of the random access preamble, the mobile terminal always transmits the random access preamble and then tries to receive the PDCCH transmitted with the RA-RNTI until the end of the random access response receiving window for the preamble. If failed, the mobile terminal should increase the amount of transmission power again to retransmit a random access preamble. That is, in order for the mobile terminal to reach an appropriate transmission power of the random access preamble, the mobile terminal should always wait for the random access response receiving window and thereafter repeat the transmission of the random access preamble, which causes unnecessary time delay during the random access procedure.

DISCLOSURE OF INVENTION

Technical Solution

Therefore, one object of the present invention is to provide a method by which a mobile terminal fast reaches an appropriate transmission power of a random access preamble during a random access procedure. To this end, there is provided a method in which using information on a specific control signal between a mobile terminal and a base station, the mobile terminal determines whether or not a random access response transmitted thereto is included in a corresponding random access response receiving window, and retries to transmit a random access preamble even before the end of the random access response receiving window according to the determination result.

To achieve these and other advantages and in accordance with the purpose of the present invention, as embodied and broadly described herein, there is provided a method for communicating data in a mobile communications system comprising: receiving first control information; transmitting a first random access preamble; receiving second control information via a specific control channel within a time window; determining whether or not a group including the transmitted first random access preamble is matched with a group indicated by the received second control information, wherein the group including the transmitted first random access preamble is classified by the first control information; and retransmitting a second random access preamble according to the determining step.

Also, the present invention may provide a mobile terminal for communicating data in a wireless communications system, the mobile terminal comprising: a transceiver adapted to transmit or receive the data; a memory adapted to store the data transmitted or received via the transceiver or from an external source; and a processor cooperating with the transceiver and the memory and adapted to perform the steps of, receiving first control information; transmitting a first random access preamble; receiving second control information via a specific control channel within a time window; determining whether or not a group including the transmitted first random access preamble is matched with a group indicated by the received second control information, wherein the group including the transmitted first random access preamble is classified by the first control information, and retransmitting a second random access preamble according to the determining step.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 1 illustrates a network structure of E-UMTS as a mobile communications system to which the related art and the present invention are applied;

FIG. 2 shows a radio interface protocol architecture in a control plane between a terminal and a Evolved UMTS Terrestrial Radio Access Network (E-UTRAN) based on 3GPP radio access network standards;

FIG. 3 shows a radio interface protocol architecture in a user plane between a terminal and a Evolved UMTS Terrestrial Radio Access Network (E-UTRAN) based on 3GPP radio access network standards;

FIG. 4 is an exemplary view showing a random access procedure according to the related art;

FIG. 5 is an exemplary view showing random access preambles classified into four groups for indicating whether or not there exists random access response information;

FIG. 6 is an exemplary view showing a method for setting bitmap information on PDCCH (Physical Downlink Control Channel) including a RA-RNTI according to the present invention; and FIG. 7 is an exemplary view showing a process of retrying to transmit a random access preamble using a random access preamble group bitmap according to the present invention.

MODE FOR THE INVENTION

One aspect of the present invention is the recognition by the present inventors regarding the problems and drawbacks of the related art described above and explained in more detail hereafter. Based upon such recognition, the features of the present invention have been developed.

The present invention is applied to a 3GPP communication technique, in particular, a Universal Mobile Telecommunications system, communication apparatus and communication method. However, without being limited to this, the present invention can be applied to all the wired/wireless communications to which the technical features of the present invention are applicable.

Hereinafter, configuration and operation of the preferred embodiments according to the present invention will be described with reference to the accompanying drawings.

The present invention provides a method in which a mobile terminal determines whether or not a random access response exists in a response receiving window according to PDCCH information including a RA-RNTI, which will now be described.

First, a base station divides entire random access preambles into N groups. FIG. 5 illustrates an example in which the random access preambles are divided into four groups in order to indicate whether or not there exists random access response information. That is, if total random access preambles are 64 and N is 4, such random access preambles are divided into four groups each including 16 random access preambles. Information related to N is informed by the base station to the mobile terminal using system information via a Radio Resource Control (RRC) signal. A bitmap represented by N bits are included in the PDCCH containing the RA-RNTI in order to indicate information related to each of the groups. FIG. 6 is an exemplary view showing a method for setting bitmap information in the PDCCH including the RA-RNTI according to the example of FIG. 5 in accordance with the present invention. As exemplarily shown in FIG. 5, if total 64 random access preambles are divided into four groups, 4 bits bitmap information is included in the PDCCH. The bitmap information indicates whether or not a random access response(s) exist(s) with respect to a random access preamble(s) included in a corresponding group. For example, if a first group includes 1st to 16th random access preambles and one or more random access responses exist with respect to the random access preambles included in the first group, the corresponding bitmap indicates that the random access response(s) exist(s) with respect to the one or more random access preambles of the first group (e.g., set to "1"). Contrast to this, if no random access response exists with respect to any of the random access preambles included in the first group, the corresponding bitmap indicates that no random access response exists with respect to any of the random access preambles of the first group (e.g., set to "0"). Here, the information transmitted via the PDCCH including the RA-RNTI may consist of 16 bits RNTI implicitly encoded in 16 bits CRC, 3 bits Modulation and Coding Scheme (MCS), 2 bits Retransmission Sequence Number (RSN), and x bits reserved.

As such, when the mobile terminal transmits a random access preamble to the base station and receives the PDCCH including the RA-RNTI associated with the PRACH radio resource by which the random access preamble is transmitted within a random access response receiving window, if the bitmap information related to groups of random access preambles included in the PDCCH is set as to that bits corresponding to the random access preamble group including the random access preambles used by the mobile terminal do not include random access response information related to the corresponding group, the mobile terminal may not receive the radio access response transmitted via the DL-SCH indicated by the PDCCH, or retry to transmit a random access preamble even before the end of the random access response receiving window.

FIG. 7 is an exemplary view showing a process of retrying to transmit a random access preamble using a random access preamble group bitmap according to the present invention.

First, the mobile terminal acquires from the base station random access preamble grouping information and contents associated with the bitmap setup of the PDCCH including the RA-RNTI (S1). Afterwards, the mobile terminal transmits a random access preamble to the base station via a selected PRACH radio resource (S2). The base station generates random access responses according to random access preambles received via the PRACH radio resources, and transmits such generated random access responses to the terminals via the DL-SCH together with the PDCCH including the RA-RNTI associated with the PRACH radio resources (S3). Here, the PDCCH bitmap information is set based on each group including random access preambles received via the PRACH radio resources for transmission. The mobile terminal tries to receive the corresponding PDCCH including the RA-RNTI from the start of the random access response receiving window. If the PDCCH was received, then the mobile terminal determines, using the bitmap information included in the PDCCH, whether or not bits corresponding to a group including the random access preamble used by the mobile terminal include the random access responses with respect to the random access preambles of the corresponding group. If it is set that bits do not include the random access response for the group including the random access preamble used by the mobile terminal, the mobile terminal can retry to transmit a random access preamble before the end of the random access response receiving window (S4). On the other hand, if it is set that bits include the random access response for the group of the random access preamble used by the mobile terminal, then the mobile terminal appropriately receives the random access response.

At the step in which the base station informs the mobile terminal of the random access preamble grouping information and the information related to the bitmap setup of the PDCCH including the RA-RNTI, the base station can transmit such information to the mobile terminal via a Radio Resource Control (RRC) signal. Here, the RRC signal may be either system information transmitted via a Broadcast Control Channel (BCCH) or RRC connection reconfiguration (or handover command) information transmitted via a Dedicated Control Channel (DCCH). Also, during the process of setting the bitmap of the PDCCH including the RA-RNTI, the base station selects random access preambles for which random access responses can be transmitted within the corresponding random access response receiving window among the random access preambles received via the one or more PRACH radio resources, so as to configure a random access response message. Accordingly, the bitmap of the PDCCH is set according to information on preamble indexes included in the random access response message, mapping information between the preamble indexes and random access preambles, random access preamble grouping information and the like.

The present invention may provide a method of communicating data in a wireless communications system, the method comprising: receiving first control information; transmitting a first random access preamble; receiving second control information via a specific control channel within a time window; determining whether or not a group including the transmitted first random access preamble is matched with a group indicated by the received second control information, wherein the group including the transmitted first random access preamble is classified by the first control information, and retransmitting a second random access preamble according to the determining step, wherein the first control information is related to bitmap configuration information, the bitmap configuration information indicates a number of group created by dividing total random access preambles, one or more random access preambles in each group are indicated by the bitmap configuration information, the first control information is received from a network via a RRC (radio resource control) signal, the RRC signal is system information on BCCH (broadcast control channel), the RRC signal is a RRC connection reconfiguration or a handover command on DCCH (dedicated control channel), the second control information is related to bitmap information, the specific control channel is a PDCCH (physical downlink control channel), the time window is a TTI (transmission time interval) window, the group indicated by the second control information is represented by a preamble Identifier included in a random access response, the first and second random access preambles are the same, the second random access preamble is retransmitted within the time window if the group including the first random access preamble is not matched with the group indicated by the second control information, or the second random access preamble is not retransmitted if the group including the first random access preamble is matched with the group indicated by the second control information.

It can be also said that the present invention may provide a mobile terminal for communicating data in a wireless communications system, the mobile terminal comprising: a transceiver adapted to transmit or receive the data; a memory adapted to store the data transmitted or received via the transceiver or from an external source; and a processor cooperating with the transceiver and the memory and adapted to perform the steps of, receiving first control information; transmitting a first random access preamble; receiving second control information via a specific control channel within a time window; determining whether or not a group including the transmitted first random access preamble is matched with a group indicated by the received second control information, wherein the group including the transmitted first random access preamble is classified by the first control information, and retransmitting a second random access preamble according to the determining step.

In the present invention, during a random access procedure, a mobile terminal can determine whether or not its random access response exists before the end of a random access response receiving window using bitmap information within a PDCCH including a RA-RNTI, so as to fast retry to transmit a random access preamble. Hence, a time delay caused when the mobile terminal reaches an appropriate transmission power of a random access preamble can greatly be reduced.

Although the present invention is described in the context of mobile communications, the present invention may also be used in any wireless communication systems using mobile devices, such as PDAs and laptop computers equipped with wireless communication capabilities (i.e. interface). Moreover, the use of certain terms to describe the present invention is not intended to limit the scope of the present invention to a certain type of wireless communication system. The present invention is also applicable to other wireless communication systems using different air interfaces and/or physical layers, for example, TDMA, CDMA, FDMA, WCDMA, OFDM, EV-DO, Wi-Max, Wi-Bro, etc.

The exemplary embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium may be accessed and executed by a processor. The code in which exemplary embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

The invention claimed is:

1. A method of communicating data in a wireless communications system, the method comprising:
   receiving, by a mobile terminal, first control information;
   transmitting, by the mobile terminal, a first random access preamble;
   receiving, by the mobile terminal, second control information via a control channel within a time window;
   determining, by the mobile terminal, whether a group including the transmitted first random access preamble is matched with a group indicated by the received second control information, the group including the transmitted first random access preamble classified by the first control information; and
   transmitting, by the mobile terminal, a second random access preamble according to the determination.

2. The method of claim 1, wherein the first control information is related to bitmap configuration information.

3. The method of claim 2, wherein the bitmap configuration information indicates a number of groups created by dividing a plurality of random access preambles.

4. The method of claim 3, wherein one or more of the plurality of random access preambles in each of the groups are indicated by the bitmap configuration information.

5. The method of claim 1, wherein the first control information is received from a network via a RRC (radio resource control) signal.

6. The method of claim 5, wherein the RRC signal is system information on a BCCH (broadcast control channel).

7. The method of claim 5, wherein the RRC signal is a RRC connection reconfiguration or a handover command on a DCCH (dedicated control channel).

8. The method of claim 1, wherein the second control information is related to bitmap information.

9. The method of claim 1, wherein the control channel is a PDCCH (physical downlink control channel).

10. The method of claim 1, wherein the time window is a TTI (transmission time interval) window.

11. The method of claim 1, wherein the group indicated by the received second control information is represented by a preamble Identifier included in a random access response.

12. The method of claim 1, wherein the first and second random access preambles are the same.

13. The method of claim 1, wherein the second random access preamble is transmitted within the time window if it is determined that the group including the transmitted first random access preamble is not matched with the group indicated by the received second control information.

14. The method of claim 1, wherein the second random access preamble is not transmitted within the time window if it is determined that the group including the transmitted first random access preamble is matched with the group indicated by the received second control information.

15. A mobile terminal comprising:
   a transceiver configured to transmit or receive data;
   a memory configured to store the data transmitted or received via the transceiver or from an external source; and
   a processor configured to cooperate with the transceiver and the memory and further configured to:
   receive first control information;
   transmit a first random access preamble;
   receive second control information via a control channel within a time window;
   determine whether a group including the transmitted first random access preamble is matched with a group indicated by the received second control information, the group including the transmitted first random access preamble classified by the first control information; and
   transmit a second random access preamble according to the determination.

* * * * *